(12) United States Patent
Najmi

(10) Patent No.: US 7,020,654 B1
(45) Date of Patent: Mar. 28, 2006

(54) METHODS AND APPARATUS FOR INDEXING CONTENT

(75) Inventor: Farrukh S. Najmi, Reading, MA (US)

(73) Assignee: SUN Microsystems, Inc., Palo Alto, CA (US)

( * ) Notice: Subject to any disclaimer, the term of this patent is extended or adjusted under 35 U.S.C. 154(b) by 501 days.

(21) Appl. No.: 10/310,488

(22) Filed: Dec. 5, 2002

Related U.S. Application Data (60) Provisional application No. 60/338,555, filed on Dec. 5, 2001.

(51) Int. Cl.
*G06F 17/00* (2006.01)

(52) U.S. Cl. .............................. 707/100; 707/2; 707/3; 707/5; 707/104.1; 709/206; 709/225

(58) Field of Classification Search .................... 707/2, 707/3, 10, 100–103 R, 104.1, 200, 5; 709/201, 709/206, 212, 217, 219, 225; 715/513, 515
See application file for complete search history.

(56) References Cited

U.S. PATENT DOCUMENTS

| | | | | |
|---|---|---|---|---|
| 5,682,524 A | * | 10/1997 | Freund et al. ................. | 711/5 |
| 5,974,409 A | * | 10/1999 | Sanu et al. ..................... | 707/3 |
| 5,991,758 A | * | 11/1999 | Ellard ............................. | 707/6 |
| 6,240,407 B1 | * | 5/2001 | Chang et al. .................. | 707/2 |
| 6,360,215 B1 | * | 3/2002 | Judd et al. ..................... | 707/3 |
| 6,654,734 B1 | * | 11/2003 | Mani et al. .................... | 707/2 |
| 6,782,391 B1 | * | 8/2004 | Scher ......................... | 707/102 |
| 2001/0020238 A1 | * | 9/2001 | Tsuda ............................. | 707/5 |

* cited by examiner

*Primary Examiner*—Jeffrey Gaffin
*Assistant Examiner*—Jacques Veillard
(74) *Attorney, Agent, or Firm*—Chapin IP Law, LLC; Barry W. Chapin, Esq.

(57) ABSTRACT

Mechanisms and techniques provide a system that operates in a computerized device to index content. Such a system allows registration of content indexing services and then receives repository content of at least one type. The system identifies a content indexing service associated with the at least one type of repository content from the set of available content indexing services. The system operates the content indexing service on the repository content to produce classification data or metadata derived from the repository content in addition to original classification data. The system then associates the classification data to a registry of classification data to allow indexing access to the repository content based on the classification data. By automatically indexing content, more comprehensive indexing is supported.

20 Claims, 5 Drawing Sheets

METHODS AND APPARATUS FOR INDEXING CONTENT

CLAIM TO BENEFIT OF FILING DATE OF PROVISIONAL APPLICATION

The present invention is related to, and claims the benefit of the filing date of co-pending Provisional U.S. Patent Application Ser. No. 60/338,555, entitled "METHODS AND APPARATUS FOR INDEXING CONTENT,", filed on Dec. 5, 2001, which is assigned to the same assignee as the present invention. The teachings and contents of this reference co-pending Provisional Patent Application are hereby incorporated herein by reference in their entirety.

FIELD OF THE INVENTION

The present invention generally relates to systems that provide indexing information associated with content, and more particularly, to systems and techniques that provide indexing information for web-based content contained within registries.

BACKGROUND OF THE INVENTION

Computer networks allow the exchange of many different types of content, data and information between computer systems and computerized devices. As an example, the Internet allows a user of web browser software operating on a client computer system to access content or data located on a server computer system across the network. The content might be audio data, video data, text or document data, database data or any other form of data. Due to such wide varieties of data types and other considerations, information system developers have created techniques to allow computer users and/or software applications to identify or classify the data or content that is to be stored and accessed in a computer system. Such techniques allow a content developer to create content such as text or audio data and to associate with that content a set of classifications or attributes that describe information related to the content. One example of a system or operational environment that allows content developers to associate classification information to content using the eXtensible Markup Language or XML.

Generally, XML provides a meta-markup language that defines a syntax used to define domain-specific, semantic, structured markup languages. As an example, a content developer may create text content such as a purchase order for a product sold by a business. The text content may be created in the form of an XML document that contains purchase order data or content identifying specifics of the purchased product. Specific examples of such purchase order content might include a detailed description of the product, the product manufacturer, technical specifications of the product, uses of the product and the like. Conventional software systems that utilize XML can provide repositories or registries that allow a content developer to register content, such as the purchase order content in the example above or other content such as, for example, product catalog content, as a "repository item" within the registry to allow other entities (customers for example) to access the content via other computer systems over a computer network such as the Internet. A data publisher or content developer or provider can thus publish content to the registry in the form of a repository item for structured access by others.

In addition to providing the repository item to the XML registry, the content developer can produce or create XML classification data or "metadata" that is related to the published repository item (i.e., is related to the content) and that conforms to an XML registry specification for such information. An example of such a specification can be found on the Internet at http://www.ebxml.org/specs/ebRIM.pdf. The terms "classification data" and "metadata" are generally used interchangeably herein. A set of metadata associated with a particular repository item is often referred to as a "registry object" and describes or catalogs the repository item. The metadata defined by a registry object includes classification data that classifies or categorizes the repository item content. Furthering the purchase order example above, if a repository item contains the purchase order content, then a registry object associated with that repository item may contain values specific to this purchase order for attributes that generically relate to all types of purchase orders. That is, the particular attributes of that registry object (i.e., that metadata) for that repository item can contain values related to that repository item. A collection of registry objects containing generically applicable metadata attributes can thus be used as an index for the repository items.

By way of example, metadata attributes may contain values that indicate that a repository item is in fact a purchase order (e.g., a "repository item type" attribute value) and may further indicate the status of the purchase order (e.g., open, closed, in progress, etc.), the type of product related to the purchase order (e.g., for goods or for services) and other values for generic or abstract information that is typically relevant to all purchase orders. Metadata does not typically describe specific low-level details related to a particular purchase order such as the product details of the item to be purchased since such details may or may not exist in other purchase orders. In other words, XML registry objects or metadata define a series of general or common attributes or characteristics and associated values or ranges of values that those attributes may acquire for general types of repository items in order to provide a general and indexable base of information associated with or related to all repository items in a registry. Typically, the content developer creates the registry object containing the metadata associated with the repository item content during or after creation of the repository item content.

The particular format of the metadata may be agreed-upon by all parties requiring access to such information (i.e., in a published XML specification) thus allowing a content producer to create a standard set of metadata for a particular type of repository content and further allowing that metadata to be accessed or queried in a standard manner by different users requiring access to such information.

One purpose of XML registry objects or metadata then is to allow efficient discovery of repository items within the XML registry by querying registry object metadata attribute information in registry objects that collectively form an index. By way of example, conventional XML registry query techniques allow a content publisher to publish a product catalog (i.e., repository item content) and associated registry object information to an XML registry. The metadata defined within the registry object(s) associated with that catalog content can be searched or queried for information concerning items in the catalog based upon the values of the metadata attributes.

For a particular type of repository item content such as audio data, an agreed-upon set of XML tags defining attributes that relate to all types of audio data can be documented in a Document Type Definition (DTD) that can be accessed by users who have a need to query an XML registry. In this manner, if an XML registry contains audio data content in the form of audio repository items, the user desiring to query such a registry to obtain information relating to be audio data such as titles of songs, artists or other information can obtain the XML DTD for this registry that defines the standardized attribute tags to which the metadata within the registry objects for this audio data is formatted. In essence, the DTD describes a schema or order and tags that are used by the registry object metadata and once this is known, the metadata can serve as an indexing mechanism for repository item content within an XML registry.

In addition to the ability to register repository item content and registry objects within conventional XML registries, such registries also provide the ability to register services such as web services that may be accessed by users or software applications. As an example, consider an organization such as a library that operates a computer system on the Internet that provides a library XML registry. The library XML registry might contain repository items such as electronic book repository content. In addition, the library XML registry might also contain registry objects containing classification data or metadata associated with each of the electronic book repository items. Such metadata may serve as an electronic card catalog to provide searchable book titles, authors, ISBN numbers, and the like. Further still, a developer of such a system may create a book checkout or reservation service (e.g., a web service) that allows a remote user on a computer network to access the library XML registry via a web browser in order to query the registry for registry object classification data (i.e., metadata) in order to determine or discover what electronic book contents is/are available for access (e.g., checkout or reservation) within the library XML registry. The book checkout or reservation service is registered with the registry in a manner similar to the way in which the library registers repository item content and/or registry objects. Such a service registered with a registry is sometimes referred to as a web service and such services "know" how to automatically read, search or otherwise access registry object classification data (i.e., metadata) in a structured manner (i.e., frequently by a graphical user interface presented to a user of such a service) to allow indexing access to repository item content also registered within the registry. Users can thus use a registry's web service(s) to identify relevant content in the register by querying the registry's metadata. Once the appropriate content is found based on the metadata query, the user may access that content.

SUMMARY OF THE INVENTION

There are a number of deficiencies associated with conventional techniques that utilize registries and/or that provide indexing access to content in a computer system environment. In particular, conventional techniques and mechanisms that allow repository items and associated registry objects (i.e., metadata) to be published to registries such as XML registries do not allow for the discovery or access to repository item content based on the actual information or data (e.g., video data, audio data, ebook data) contained within the content. In other words, using conventional XML content accessing techniques, repository item content is indirectly accessed by querying or otherwise accessing registry object metadata indexing information in a search for attribute values of interest that then identify related repository item content that may then be obtained. A conventional registered web service within, for instance, an ebXML registry may be used to provide such metadata queries. Once a query produces metadata attribute values of interest, a user or software application providing such a query can then obtain the associated repository item content to which the metadata containing the attribute value(s) of interest relates. This is generally the case in conventional systems due to the fact that repository item content can be completely arbitrary in structure thus making a uniform search capability of such content difficult or impossible for conventional XML registries.

Using the example of purchase order repository items discussed above, different purchase orders for different products or different purchase orders from different businesses or companies or suppliers may each be formatted in different ways and may each contain different types of product information having more or less detail as may or may not be required for those purchase orders for those products. An XML registry (e.g., an ebXML registry frequently used to store business information) can store the details (i.e., the content) of each purchase order in respective repository items for each purchase order, but since each may be non-uniform, accurately searching such repository items is fraught with difficulties. However, since purchase orders generally all share a number of common attributes or characteristics, purchase order content creators can store such general purchase order information within predefined or standardized registry objects such as XML documents containing metadata for use in describing properties or attributes common to the general nature of purchase orders. As an example, most purchase orders include information such as customer name, supplier name, purchase date, cost and the like. Purchase order content creators (i.e., which may be a software application that automatically generates purchase orders) can also generate registry object metadata for those purchase orders that contain this general purchase order information to allow querying of the purchase order database without requiring intimate knowledge of the structure or organization or format of each of the different repository items containing specific (and varying) purchase order content. Accordingly, indexed access to purchase orders in such a system is done based upon the registry object classification data or metadata that is created to generically describe a particular purchase order rather than accessing the purchase order content itself (i.e., rather than accessing the repository item when attempting to find a particular purchase order from a number of purchase orders within a registry).

Stated generally, since the actual content of repository items for similar types of content can take on different forms and can be organized in different structures, conventional techniques rely on access to such data by querying the associated and standard format registry object metadata that operates as an index to discover or find the content of interest within a registry. Once the metadata query process produces attribute values of interest, the user or software application providing such a query can then access the repository item content associated with that particular attribute.

The deficiency thus arises in that repository item content is often rich in information and thus only relying on registry object classification data in seeking desired repository item content can result in the potential for missing important repository item content of interest in the event that metadata associated with such content does not happen to contain attribute values of interest to a user.

Considering the electronic library book example noted above, if the metadata is limited to identifying the title, author, publisher and other scant information concerning the book, a user seeking a book containing general information on a specific topic or seeking a book that contains a specific reference to just one character might be unable to accurately access such electronic book repository contents since the metadata associated with that content provides no attributes containing values for such discrete information.

As a more specific example of this problem, books concerning the subject of physics may contain a chapter discussing the theory of relativity, but may be general physics books (e.g., a first year college physics textbook). If a user providing a query to a conventional XML registry containing electronic book content is searching for physics books that contain general information on the theory of relativity, conventional indexed registries might only produce search results for physics books that are entirely about the theory of relativity since this search phrase would most likely be contained within the title of the book (e.g., "Principles of the Theory of Relativity") for example. However, those physics books that might only contain a single chapter introducing the theory of relativity may not be discovered in such a query since the title of the book might simply be "General Physics" and there may be no registry object metadata information related to this repository item content (i.e., to the electronic general physics book contents) that includes the theory of relativity as a specific value of the metadata attribute. As a result, the user only obtains highly complex books that contain too much detail on the topic as opposed to all books that have any relation to the subject whatsoever.

Embodiments of the present invention can significantly overcome such deficiencies. Embodiments of the invention provide techniques and mechanisms that allow web service creators to publish content indexing services (i.e., web services) to a registry. The content indexing services are capable of automatically operating on (e.g., analyzing) repository content of one or more specific content types to produce metadata or classification data associated with that repository content in addition to registry object metadata or classification data which may be already registered within the registry for that repository content. In other words, embodiments of the invention allow registration of specific content indexing services designed to index or analyze specific types of content in order to produce metadata derived from the content itself within the repository items in addition to the metadata originally provided with the repository item. In addition, embodiments of the invention allow publishers or producers of repository item content to be able to access and utilize such registered content indexing web services within a registry in order to automatically index repository item content which those content producers provide to the registry. This allows indexing access to the repository content based on the classification data produced as a result of the operation of a content indexing service associated with the type of content published to the registry by that producer.

As an example, a content producer who produces purchase orders to be stored within a purchase order registry might register the repository content for those purchase orders with the registry. In addition, such content producers can further register a first set of classification data such as the original metadata associated with that purchase order within the registry. Using conventional techniques as explained above, these actions alone allow indexing access to the purchase orders based on the first or original set of classification data or metadata provided along with the repository content for the purchase orders. However, in a system equipped with an embodiments of the invention, such embodiments are capable of receiving the repository content and identifying a specific (one or more) content indexing service from a set of available (i.e., registered) content indexing services associated with the type of repository content submitted for registration to the registry. As an example, in the case of purchase order repository content submitted for registration to the registry, embodiments of the invention can identify a purchase order content indexing service. Once identified, embodiments of the invention can operate the content indexing service on the purchase order repository content to produce a second set of additional purchase order classification data associated with that purchase order repository content. The additional purchase order classification data produced as a result of this operation contains values for attributes that are derived from analysis of the purchase order repository content itself. Such embodiments can also associate this second set of classification data to the registry to allow indexing access to the repository content based upon both the first set of classification data (i.e., the original metadata) and the second set of classification data (additional metadata) produced as a result of the operation of specific content indexing service associated with the type of content upon content submitted to the registry.

In a system configured according to one embodiment of the invention, there may be many content indexing services for different types of repository content which are each registered as web services within the registry. The content publishers who publish different types of content such as audio data, video data, electronic book data, text data, multimedia data or any other types of data can submit their content to a system configured with an embodiment of the invention and such an embodiment can determine, based on the type of repository content submitted, which content indexing service(s) is/are appropriate to index the repository content submitted. Once identified, operation of that content indexing service (or multiple content indexing services if the content contains data of different types) can proceed as briefly explained above in order to produce classification data directly derived from analysis of the repository content.

As a specific example of the usefulness of such a system configured according to one embodiment of the invention, complex repository content such as the entire contents of electronic book such as the general physics book from the example above can be submitted to a system configured according to an embodiment of the invention. A first set of metadata or classification data might exist for the general physics electronic book content that indicates, for example, the title of the book (e.g., "General Physics"), the author, the publisher, the publication date and possibly a brief abstract of the subject matter of the book. Such a first set of classification data might not contain any attribute value information for the theory of relativity. However, the content indexing service designed to perform content indexing of electronic book content or data can be registered according to an embodiment of the invention and when the general physics electronic book content is submitted to a system configured as such, embodiments of the invention can operate an electronic book content indexing service to perform a more thorough analysis of the electronic book repository content to produce a second set of classification data that might, for instance, indicate details of the electronic book repository content such as how many chapters are in the book, the title of each chapter (including the theory of relativity chapter), character names within the book, places such as cities, states or towns referenced within the book and other such information directly derived from analysis of the electronic book repository contents.

Since embodiments of the invention can also associate this automatically generated second set of classification data to the registry in addition to any original classification data (i.e., a first set) initially submitted to the registry along with the initial submission of the repository content, indexing access to the repository content can be performed in a much more comprehensive manner. Continuing with the general physics example above, the user submitting the query for physics books containing information on the theory of relativity to a system equipped to operate an embodiment of the invention when successfully receive the title of the general physics book containing the single chapter on the rate of relativity within his or her query results.

More particularly, the present invention provides method and apparatus embodiments for indexing content. Once such method embodiment comprises the steps of receiving repository content of at least one type. The type of repository content can be any type of content, data or information such as audio data, video data, text data, document data, database data, book data, contract data, signal processing data, or any other content of one or more specific types. The embodiment of the invention identifies a content indexing service (one or more) from a set of available content indexing services. The identified content indexing service is associated with the type or types of repository content received. This embodiment of the invention then operates the identified content indexing service on the repository content to produce classification data (i.e., in addition to any initial classification data received) derived from (i.e., from an analysis of) the repository content and then associates this classification data to a registry of classification data to allow indexing access to the repository content based on the classification data. Since the classification data is produced as a result of the operation of the content indexing service indexing the repository content received, classification data can accurately reflect specific details or values derived directly from the repository content rather than relying only on generalized original classification data originally submitted with the repository content which may only contains values for attributes that generically describe any repository item of that same type.

Since embodiments of the invention allow the ability to register different content indexing services with a set of available content indexing services, the system is expandable as different types of content are created over time. In such cases, a user of an embodiment of the invention can develop a new content indexing service capable of indexing content of the new type and can register this new content indexing service with an embodiment of the invention such that content publishers who submit repository items containing content of this new type can automatically have this content indexed by the new content indexing service in order to produce classification data derived directly from the content itself rather than relying on generic or original classification data or metadata produced during content creation which lacks explicit details of the content. Embodiments of the invention thus produce a system that allows in-depth indexing access to repository content.

Embodiments of the invention can be implemented as methods in a process or as circuitry or hardware or as software or a combination of hardware and software within a computerized device or as software encoded within a computer readable medium. In particular, other embodiments of the invention include a computer system, such as a computerized device, workstation, handheld or laptop computer, or other device configured with software and/or circuitry to process all of the method operations disclosed herein as embodiments of the invention. In such embodiments, the computerized device is capable of indexing content using one or more of a plurality of content indexing services and includes a processor, a memory, and an interconnection mechanism that couples the processor and the memory. The processor executes an indexing controller application that causes the processor to produce an indexing controller process that performs the operations of embodiments of the invention as explained herein. A computerized device such as a computer that is programmed to operate an XML registry and associated applications as explained herein is considered an embodiment of the invention.

Other arrangements of embodiments of the invention that are disclosed herein include software programs to perform the method embodiment steps and operations summarized above and disclosed in detail below. In one embodiment of the invention, a computer program product is disclosed which has a computer-readable medium including computer program logic encoded thereon that, when executed on at least one processor with a computing system or computerized device, causes the processor to perform the operations (e.g., the methods and steps) disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as a combination of software and hardware, or as hardware alone. Example embodiments of the invention may be implemented within computer systems, computer program products, operating systems and software applications manufactured by Sun Microsystems of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the invention provide mechanisms and techniques for indexing content such as repository item content for use in accessing data in an information processing system. In particular, embodiments of the invention allow a user to register one or more content indexing services with an indexing controller operating in an index server computer system that may be coupled to a computer network such as the Internet. The content indexing services are capable of analyzing repository content submitted to the index server computer system and can produce additional classification data based on the analysis of the repository content. The classification data can provide values for attributes in a metadata format (e.g., in an XML format) that provides detailed information concerning the content of the repository item.

Once content indexing services are registered, a user of embodiments of the invention can submit repository content to an index server computer system configured with an indexing controller operating according to embodiments of the invention. The indexing controller can receive the repository content and can determine or otherwise identify which particular set of one or more content indexing services should be used to analyze the repository content to produce additional classification data in addition to original classification data that may be associated with the repository content (i.e., original metadata initially received with the repository content). By operating the appropriate content indexing services upon the repository content, and by associating the classification data produced for such operation to a registry of classification data, embodiments of the invention allow indexing access to repository content based on the classification data produced from the content indexing service in addition to any classification data originally provided with the repository content thus allowing more comprehensive indexing access to repository content.

Figure 1:
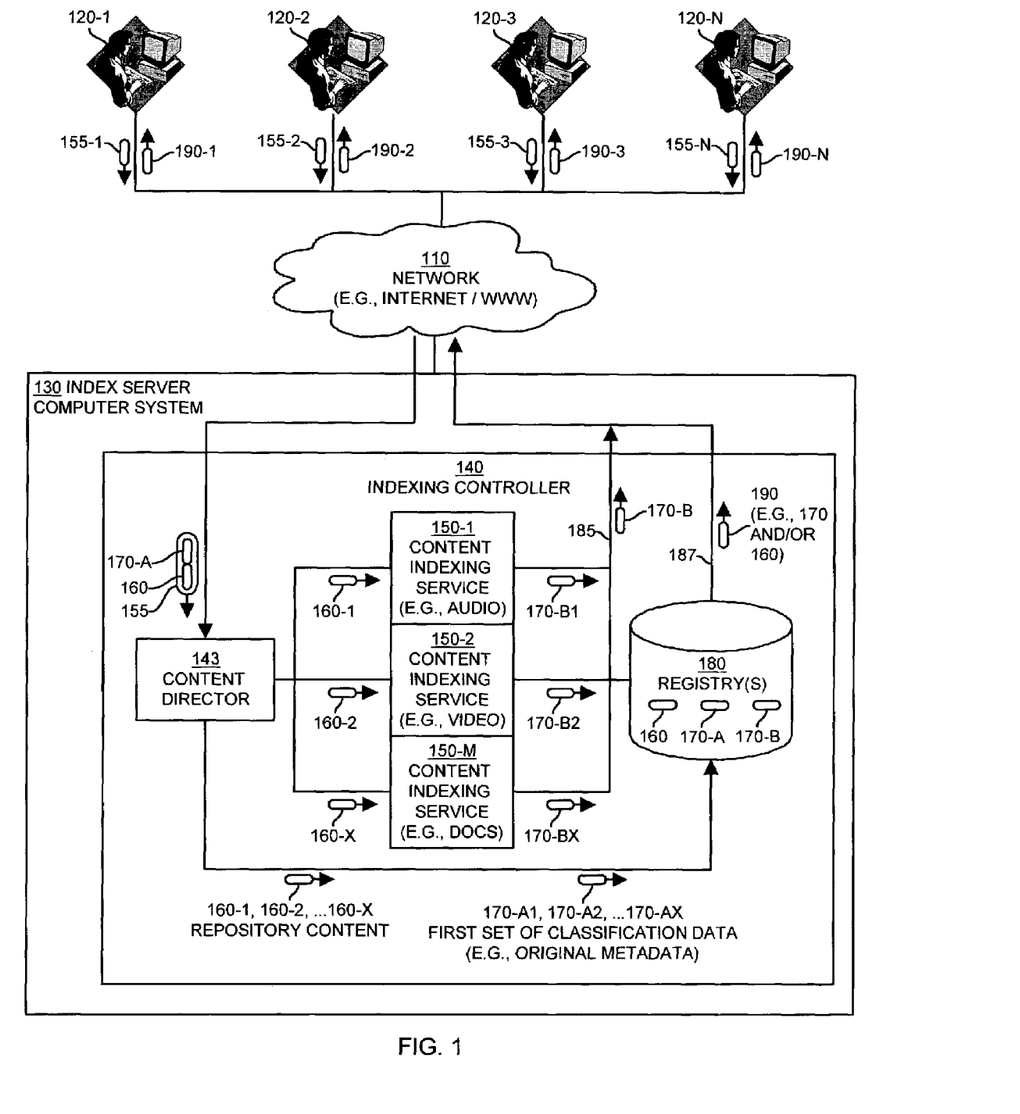
FIG. 1 illustrates an example computing system environment including an index server computer system configured with an indexing controller according to one embodiment of the invention.

FIG. 1 illustrates a computing system environment 100 configured to operate according to one example embodiment of the invention. The computing system environment 100 includes a computer network 110 which interconnects a series of content clients 120-1 through 120-N and a content indexing service provider 125 to an index server computer system 130 configured according to one embodiment of the invention. Each content client 120 represents a content publisher that can produce respective repository submissions 155-1 through 155-N containing repository content (160, to be explained) for submission to the index server computer system 130. In response to such repository submissions 155, the index server computer system 130 returns registry responses 190 which can contain classification data 170 (to be explained) and/or repository content 160 or query results identifying such information. The content indexing service provider 125 can submit content indexing services 150 to the index server computer system 130 as will be explained for registration as a web service(s) capable of indexing one or more specific types of repository content 160.

The index server computer system 130 operates an indexing controller 140 configured according to embodiments of the invention. This example indexing controller 140 includes a content director 143, a set of available content indexing services 150-1 through 150-M, and one or more registries 180. As briefly noted above, one or more content clients 120 can submit one or more repository submissions 155 to the index server computer system 130 for receipt by the indexing controller 140. As illustrated in some detail in FIG. 1 within the example repository submission 155 above the content director 143, a typical repository submission 155 includes repository content 160 and optionally includes an original or first set of classification data 170-A.

The repository content 160 represents any type of content, data or other information that may or may not be organized according to any particular format, encoding technique or other structure. Examples of repository content 160 include audio data, video data, multimedia data, text data, database data, ebook, XML documents, or other types of data. In one embodiment of the invention, the repository content 160 is always organized within the constructs of an XML document. That is, the repository content 160 in such embodiments is an XML document containing repository content of one or more of the specific types identified above or of another type not specifically listed. The first set of classification data 170-A represents registry object classification data or metadata associated with the repository content 160. As an example, if the repository content 160 is audio data encoded in a specific format, the original or first set of classification data 170-A submitted by a content client 120 (i.e., as a repository submission 155) might contain XML metadata having values of attributes that identify the particular title of the audio data repository content 160, as well as a publisher or producer of such content, and an artist who created the audio data.

Generally, a content client 120 provides a repository submission 155 containing repository content 160 for submission to one or more of the registries 180 maintained by the indexing controller 140 for subsequent indexing access to such repository content based upon classification data. The content director 143 receives such repository submissions 155 and registers or otherwise deposits the original repository content 160 and the original or first set of classification data 170-A into the appropriate registry 180. In addition however, according to embodiments of the invention, the content director 143 is capable of selecting or identifying a particular content indexing service 150 which matches, relates to or is otherwise associated with the type of repository content 160 submitted with the repository submission 155. Once identified, the content director 143 can provide the repository content 160 to the identified content indexing service 150 such that the content indexing service 150 can analyze the repository content 160 of that specific type and can produce a second set of classification data 170-B. As indicated in the summary above, the second set of classification data 170-B produced from operation of the content indexing service 150 upon the repository content 160 can provide metadata or a second set of classification data indicating attribute values produced from the detailed analysis of the repository content 160.

As an example, if the repository content 160-1 received within repository submission 155-1 contains audio data (i.e., its type is audio data), the content director 143 will identify the audio content indexing service 150-1 as the appropriate content indexing service to index the audio repository content 160-1 (i.e., the audio data such as MP3 music data). Accordingly, operation of the content indexing service 150-1 on the audio repository content 160-1 can produce the second set of classification data 170-B 1 that contains a detailed analysis of the audio data within the repository content 160-1. Such detailed analysis might indicate, for example, the musical fidelity at which this specific audio repository content 160-1 is encoded at, the overall length of the audio data, any breaks or silent periods that might exist within the audio data as well as their specific locations (e.g., seconds from the start of playback of the audio data) in the content (i.e., for editing or playback purposes), and other information that may be pertinent to audio repository content 160-1.

The content indexing service 151 can be as elaborate or as simple as may be required to perform an indexing analysis operation on the repository content 160. A content indexing service producer 125 determines the exact operational details of the content indexing service 150 during its creation and then registers the content indexing service 150 with the indexing controller 140 thus including that specific content indexing service 150 within the available set of content indexing services for selection by the content director 143 upon receipt of a repository submission 155 containing repository content 160 that is to be indexed to produce a second set of classification data 170-B.

Once the content director 143 has passed the repository content 160 to the appropriate content indexing service(s) 150 (more than one service 150 may be activated if a single repository content 160 submission contains multiple types of content), the indexing controller 140 can direct the classification data 170-B (i.e., the second set of classification data produced in addition to any first set of classification data 170-A that may have been included within the initial repository submission 155) to either be provided back to the content client 120 who provided the initial repository submission 155 or alternatively, the indexing controller 140 can associate, deposit or otherwise place the second set of classification data 170-B into an appropriate registry 180 to allow indexing access to the repository content 160 based upon the combined collection of first and second set of classification data 170-A and 170-B. In other words, an indexing controller 140 configured according to embodiments of the invention can either receive repository content submissions 160 to which content indexing services 150 may be applied to produce second sets of classification data 170-B that may be immediately returned (as indicated at location 185 in FIG. 1) to the content client 120, or alternatively, such classification data 170-B may be further included/registered within the registry(s) 180 to allow more comprehensive indexing access to repository content 160 that is also registered within the registry(s) 180.

Figure 2:
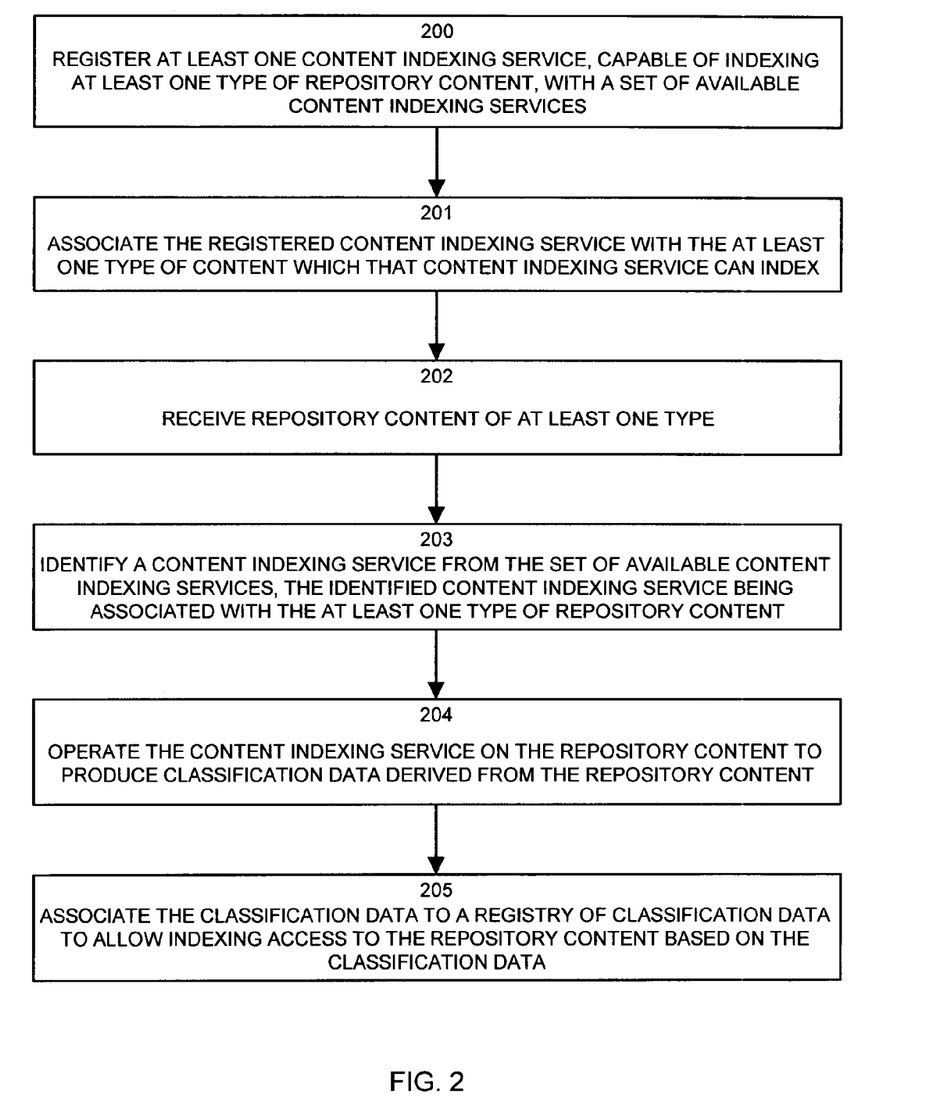
FIG. 2 is a flow chart of processing steps performed by an indexing controller configured according to one embodiment of the invention.

Reference is now made to the flow chart of processing steps in FIG. 2 that illustrate an example operation of embodiments of the invention with respect to the example configuration illustrated in FIG. 1.

FIG. 2 is a flow chart of processing steps performed by an index server computer system 130 equipped with an indexing controller 140 configured according to one embodiment of the invention. The description of the processing steps shown in FIG. 2 will be provided from the perspective of operation of the indexing controller 140 shown in FIG. 1.

In step 200 the indexing controller 140 receives and registers at least one content indexing service 150 with a set of available content indexing services (i.e., the collection of content indexing services 150-1 through 150-M as illustrated within the indexing controller 140). In the example embodiment of the invention illustrated in FIG. 1, the indexing controller 140 receives content indexing services 150 in the form of registerable web services from a content indexing service provider 125. It is noted here that the content indexing service provider 125 may be the same entity as a content client 120. The content indexing service 150 (one or more of which are received and registered) is capable of indexing at least one type of repository content 160. In other words, in one embodiment of the invention, each content indexing service 150 is designed and developed by a content index service provider 125 to index a specific type of repository content 160 such as audio data, video data, text data, purchase order data or any other type of data or information.

Once registered, in step 201, the indexing controller 140 associates the registered content indexing service 150 with at least one type of repository content 160 that the content indexing service 150 can index. In other words, the indexing controller 140 creates an association between the content indexing service 150 and the type of data that the content indexing service is designed to index. This may be stored in a service/type database.

Next, in step 202, the indexing controller 140 operates to receive repository content 160 of at least one type (i.e., submitted within a repository submission 155). Generally, the repository content 160 will contain a single type of data or information. Embodiments of the invention are not limited as such however and a single repository content submission 160 can contain many different types of content such as audio and video data, or may be an entire multimedia presentation have text, audio, video, graphics, and the like.

In step 203, the indexing controller 140 identifies a content indexing service 150 from the set of available content indexing services 150-1 through 150-M. The identified content indexing service 150 is associated with the type of repository content received in step 202. That is, the repository content 160 received in step 202 is associated with a specific type of repository content and the indexing service identified in step 203 by the indexing controller 140 (e.g., specifically by the content director 143 in the example in FIG. 1) is selected or identified by matching the type of the repository content 160 to the type of repository content that a specific content indexing service 150 can index. It is to be understood that the example illustration FIG. 1 shows individual content indexing services 150 each identifying a specific content type for which they are optimized to index. However, in alternative embodiments of the invention, a single content indexing service might provide content indexing services for multiple types of repository content and can be capable of producing classification data as one or more sets of metadata for each type of repository content. In such cases, that single content indexing service would be associated with multiple types of content in step 201.

In step 204, the content director 143 operating within the indexing controller 140 operates the appropriate identified content indexing service 150 on the repository content 160 to produce classification data 170-B derived from the repository content 160 itself. In other words, the classification data 170-B produced by the content indexing service 150 is a second set of classification data produced in addition to the existence of the first set of classification data 170-A that may have already been received with the repository submission 155 and that may also have already been associated or registered with the registry in conjunction with or separately from (but still associated with) the repository content 160.

Next, in step 205, the indexing controller 140 associates the classification data 170-B to a registry of classification data 180 to allow indexing access to the repository content 160 based on the classification data 170-B. If the indexing controller 140 also receives (e.g., in step 202 along with the repository content 160) a first set of classification data 170-A, the content director 143 can direct the first set of classification data 170-A to also be registered within the appropriate registry 180. The operation of step 205 thus associates the additional or second set of classification data into the registry 180 in addition to the first set of classification data 170-A which may or may not already exist within the registry 180 (i.e., as a result of operation of the content director 143 receiving such original or first classification data 170-A in the past).

In this manner, the aforementioned processing allows an index server computer system 130 operating an indexing controller 140 to receive many different repository submissions 155 having repository content 160 of many different types and is able to select an appropriate content indexing service 150 which can produce additional classification data or metadata 170-B based on an analysis of the repository content submission 160 and can associate this additional or second set of metadata or classification data into a registry 180 to allow indexing access based on this extra information. As a result, comprehensive queries may be performed based not only on original classification data 170-A that is initially submitted with the repository content 160, but also on the classification data 170-B produced as a result of the detailed analysis of the repository content 160. Depending upon the robustness or level of indexing analysis performed by the identified content indexing service 150, registry queries can obtain quite detailed information regarding repository content 160 accessible within the registry 180.

Figure 3:
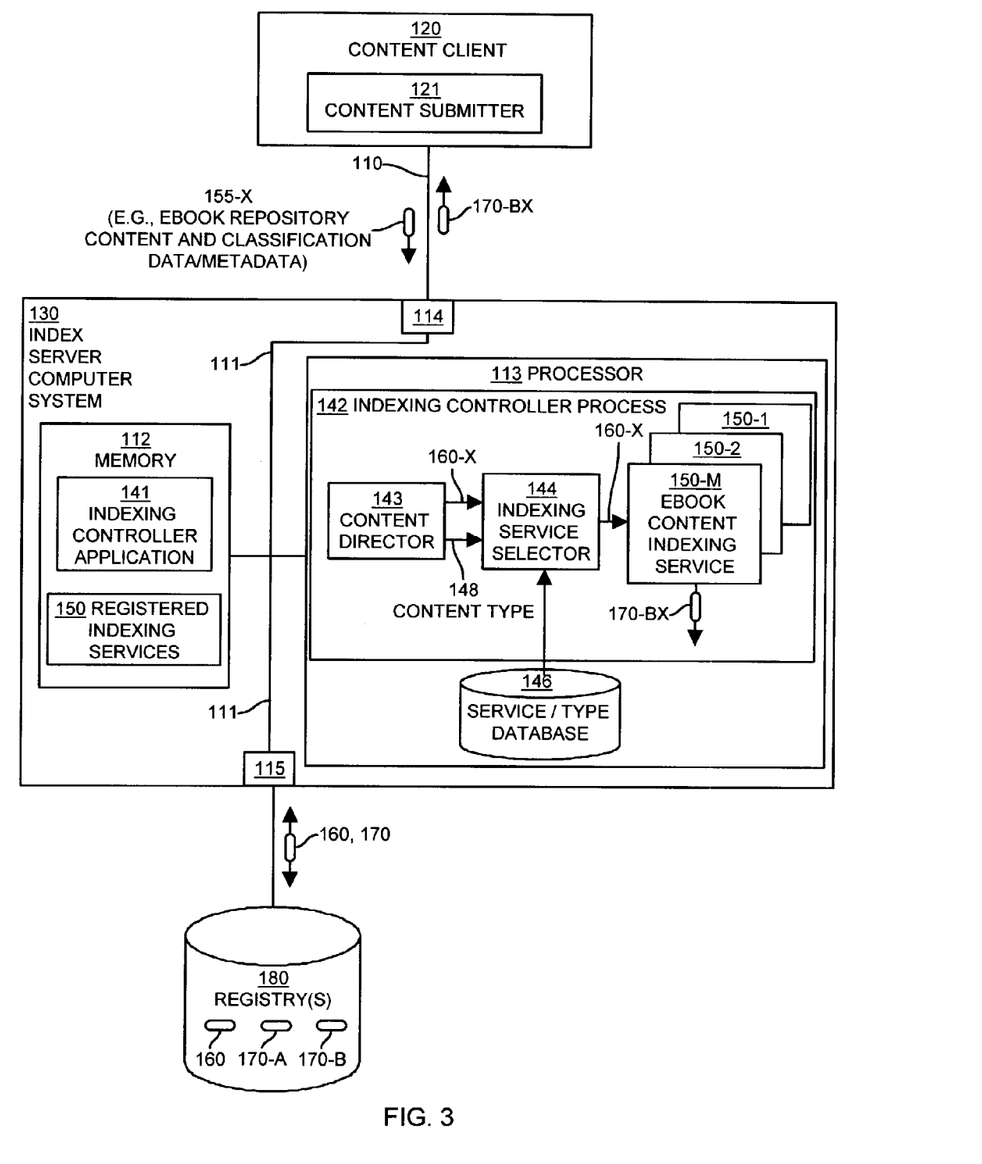
FIG. 3 illustrates an architecture and data flow diagram for an index server computer system configured according to one embodiment of the invention.

FIG. 3 illustrates an example architecture of an index server computer system 130. The index server computer system 130 may be any type of computerized device such as a personal computer, workstation, portable computing device (e.g., laptop, palmtop or handheld computers), mainframe, server, or the like. The example index server computer system 130 includes an interconnection mechanism 111 (e.g., a data bus and/or circuitry) which couples a memory 112 (e.g., any computer readable medium such as random access memory (RAM) and/or read only memory (ROM) or even a disk or other storage medium), a processor 113 (e.g., a microprocessor or central processing unit), a communications interface 114 (e.g., modem, port or other network interface) and an input/output interface 115 (e.g., peripheral device port(s) for a mouse, keyboard, disk drives, file servers, etc.). The communications interface 114 allows the index server computer system 130 to communicate with content clients 120 via the computer network 110.

Within the index server computer system 130, the memory 112 is encoded with a indexing controller application 141 and registered indexing services 150 which may be accessed as needed to index repository content 160. The indexing controller application 141 is software code, data, data structures, classes, objects, logic instructions or the like that embody the processing functionality, data and operation of embodiments of the invention. The processor 113 can access the memory 112 via the interconnection mechanism 111 in order to launch, run, execute, interpret or otherwise perform the logic instructions of the indexing controller application 141 in order to produce the indexing controller process 142. In other words, the indexing controller process 142 represents one or more portions of the indexing controller application 141 (or the entire application 141) performing within or upon the processor 113 in the index server computer system 130.

It is to be understood that embodiments of the invention include the indexing controller application 141 (i.e., the un-executed or non-performing logic instructions and/or data) encoded within a computer readable medium such as a floppy disk, hard disk or in an optical medium, or in firmware or, as in this example, as executable code within the memory 112 (e.g., within RAM). It is also to be understood that other embodiments of the invention comprise the indexing controller application 141 operating within the processor 113 as the indexing controller process 142 and that other embodiments include the index server computer system 130 operating to provide an indexing system such as that explained herein. Those skilled in the art will understand that the index server computer system 130 can also include other processes and/or components, such as an operating system and additional processors 113.

Also as illustrated in FIG. 3, the indexing controller process 142 implements the content director 143 as previously explained and further includes an indexing service selector 144 which is capable of selecting one or more content indexing services 150 from the available set of registered indexing services 150 (e.g., accessible within the memory 112 or within another computer readable storage medium). The indexing service selector 144 can access a service type database 146 which associates particular registered indexing services 150 with particular repository content types. Accordingly, during operation of the indexing controller process 142, the content director 143 provides a pointer or other reference to the repository content 160-X in addition to the content type 148 associated with that repository content 160-X. The content director 143 can determine or otherwise obtain the repository content type from the value of an attribute within the first set of classification data 170-A which may indicate the particular type and identity of content to which this classification data 170-A relates. The indexing service selector 144 performs the operation of step 203 discussed above with respect to FIG. 2 in order to identify the appropriate content indexing service 150 and passes that content indexing service the reference, pointer or other identity of the repository content 160-X such that the content indexing service 150 can operate in step 204 (FIG. 2) to perform the indexing operation(s) previously described to produce the second set of classification data 170-BX. The indexing controller process 142 can then store or otherwise associate the second set of classification data 170-BX to the registry of classification data 180 to allow indexing access to the repository content based on this classification data. Indexing access may also be based upon the first set of classification data 170-A that is registered along with the repository content 160 into the registry 180 in a conventional manner.

In the specific example illustrated in FIG. 3, a content client 120 operates a content submitter 121 which may be a software applications such as a web browser that provides a repository submission 155-X which in this example is an electronic book (ebook) containing repository content 160-X and original classification data 170-A or metadata associated with the ebook repository content 160-X. As a result of this submission and receipt by the communications interface 114 of the index server computer system 130, the indexing controller process, and more specifically the indexing service selector 144, identifies an electronic book content indexing service 150-M as the appropriate service 150 to perform the indexing operation on the ebook repository content 160-X. As a result of this indexing operation on the repository content 160-X, the electronic book content indexing service 150-M produces the second set of classification data 170-BX that contains details derived from analysis of the book repository content 160-X other than those attribute values defined within the first or original set of classification data 170-AX.

Figure 4:
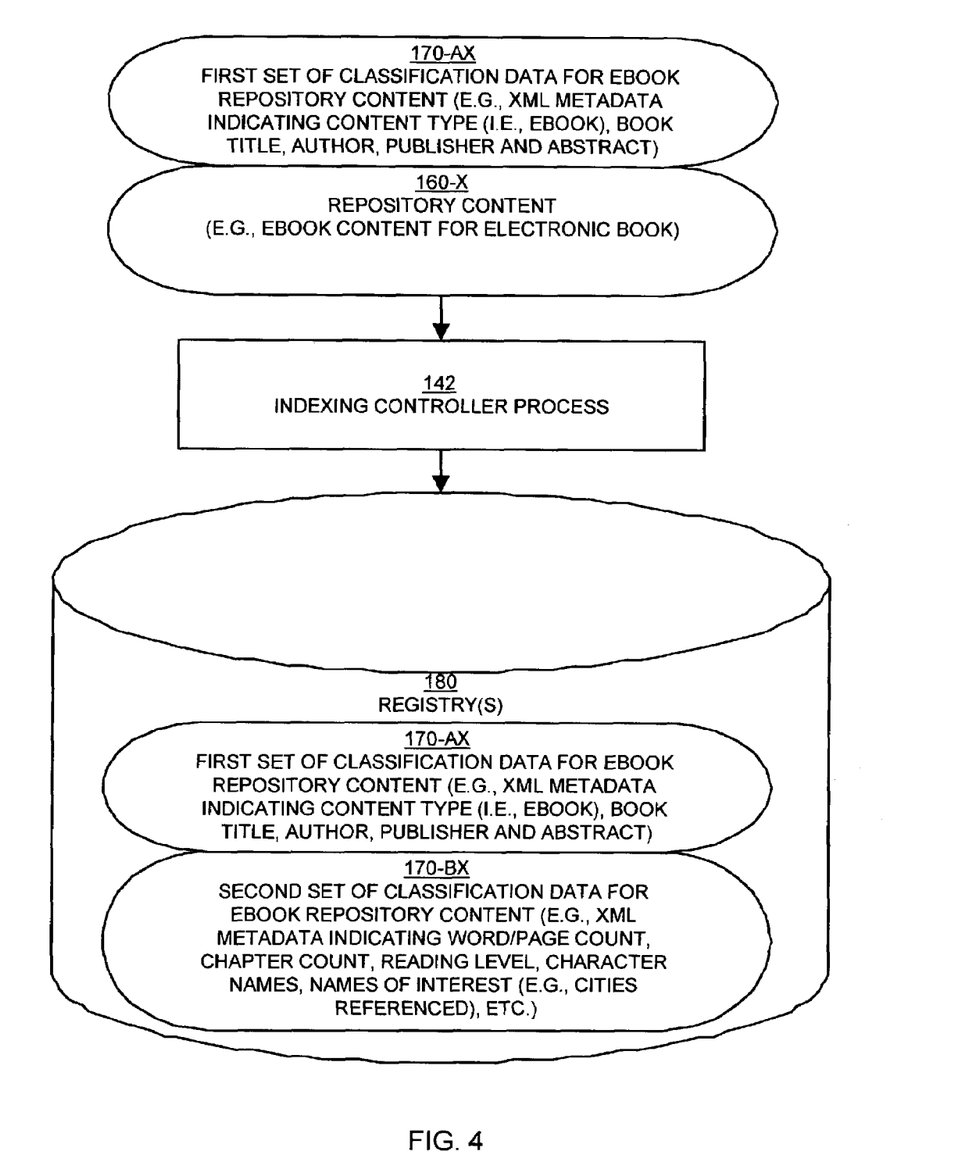
FIG. 4 illustrates an example of a second set of classification data produced by an indexing controller process operating upon received repository content according to one embodiment of the invention.

FIG. 4 illustrates the results of such processing in more detail. Specifically, the indexing controller process 142 receives a repository submission 155-X (FIG. 3) that includes a first set of classification data 170-AX for the book repository content as well as the book repository content 160-X itself. The book repository content 160-X represents the entire contents of the electronic book including text, figures, drawings, and any other information contained therein. The first set of classification data 170-AX contains, in this example, XML metadata indicating the content type (ebook content in this example), the book title, the author of the book, the publisher of the book and an abstract summarizing the subject matter of the book. It is noted that the first set of classification data 170-AX is not derived from an analysis of the ebook repository content 160-X, but rather is created separately by the publisher of the ebook repository content 160-X in order to provide some general index criteria such as card catalog information that may be used by, for example, by a library in order to properly catalog the ebook repository content 160-X. The first set of classification data 170-AX does not contain specific details such as characters in the book, chapter titles, and other information.

The indexing controller process 142 operates as previously explained in this example to place into one or more registries 180, the first set of classification data 170-AX, the second set of classification data 170-BX (after automatic generation by the operations explained herein), and the book repository contents 160-X. In this manner, the registry 180 is able to receive queries from computer systems such as the content client 120 over the computer network 110 and such queries can be processed for indexing access against both first and second sets of classification data 170-AX and 170-BX for a more thorough indexing access process. That is, since embodiments of the invention select a content indexing service 150 from a pool of such services to produce a second set of classification data 170-BX based on the detailed analysis processing built into such a serve, the registry information 180 related to that electronic book repository content 160-X is more thorough then had an embodiment of the invention not been utilized in which case the only indexing information available for the electronic book repository content 160-X would have been the original or first set of classification data 170-AX.

Figure 5:
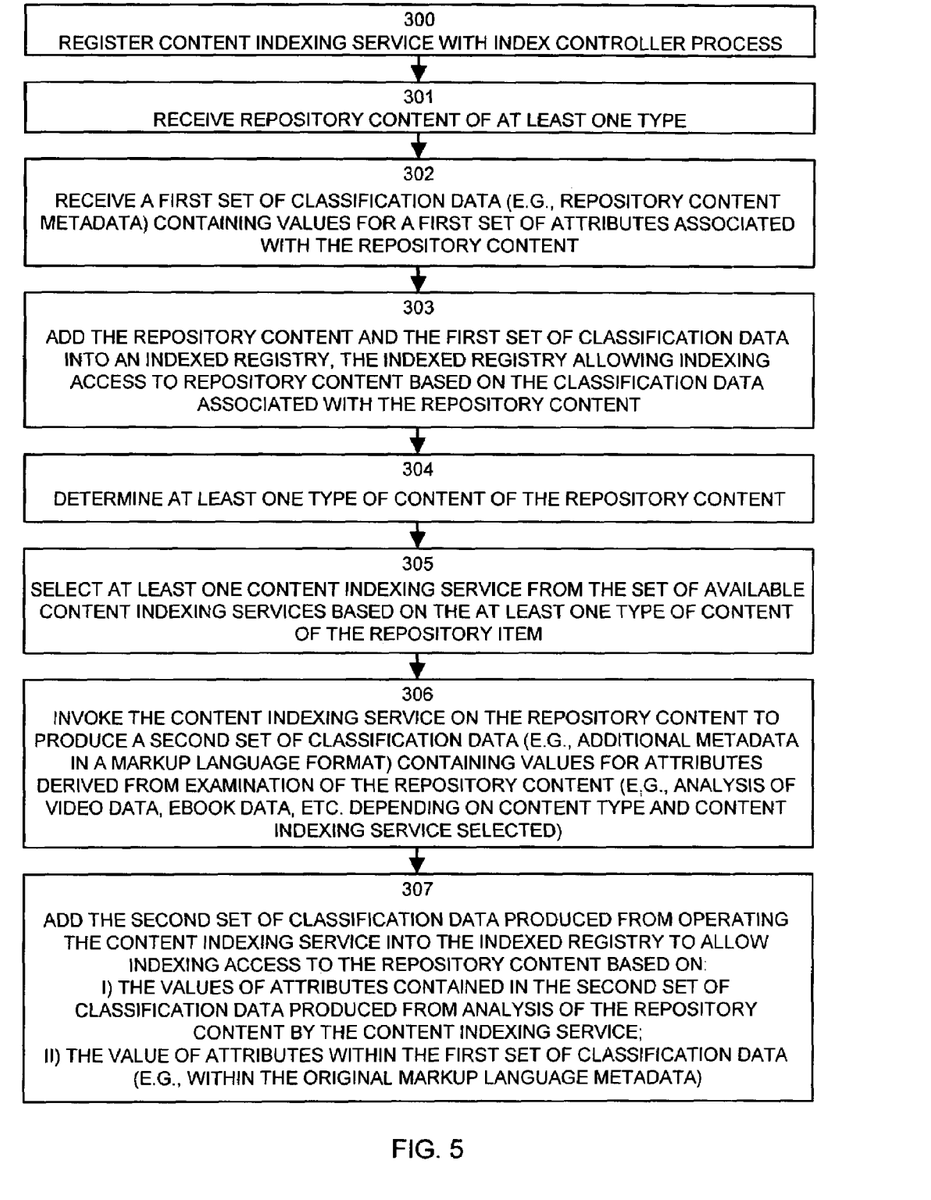
FIG. 5 is a more detailed flow chart of processing steps performed by an indexing controller process configured according to one embodiment of the invention.

FIG. 5 is a flow chart of processing steps that show an example operation of a more detailed embodiment of the invention in order to operate a content indexing service 150 to produce a second set of classification data as illustrated in FIGS. 3 and 4. The processing steps shown in a flow chart in FIG. 5 are performed in this example by the indexing controller process 142 operating upon the processor 113 within the index server computer system 130 shown in FIG. 3.

In step 300, the indexing controller process 142 registers a content indexing service 150 and, as explained with respect to step 201 in FIG. 2, associates the registered content indexing service 150 in the service type database 146 in order to associate a specific type of content which that content indexing service can index upon detection or receipt of such content.

In step 301, the indexing controller process 142 receives repository content 160 of at least one type. As previously noted, repository content may be one type of content or may contain multiple types of content. In one embodiment of the invention, the indexing controller process 142 can discover or otherwise determine the specific type(s) of repository content received by examining the first set of classification data 170-A to search for an attribute that identifies the content type for the associated repository content 160 that is related to the first set of classification data 170-A. In other words, the indexing controller process 142 can analyze the metadata received in conjunction with repository content in order to determine the type(s) of content contained within the repository content 160.

Next, in step 303, the indexing controller process 142 adds the repository content 160 and the first set of classification data 170-A into an index registry 180. The index registry 180 allows indexing access to repository content 160 stored therein based upon all classification data associated with that repository content also stored within the registry 180. After processing step 303, only the first set of classification data 170-A is associated to the repository content 160 within the registry 180. That is, only the original metadata received along with the repository content 160 is registered with the registry 180 and is usable for indexing access to the repository content.

Next, in step 304, the indexing controller process 142 determines at least one type of content of (i.e., associated with) the repository content 160 that was received and added to the registry 180. As noted above, the determination of the type of repository content can be made by an examination or search for a content type attribute within the first set of classification data 170-A.

Next, in step 305, based on the determination of the type of content of repository content 160, the indexing controller process 142 selects at least one content indexing service 150 from the set of available (i.e., registered) content indexing services 150-1 through 150-M (FIG. 1). Specifically, the indexing service selector 144 identifies one or more content indexing services 150 which can appropriately analyze the repository content 160 received in order to produce one or more second sets of classification data 170-B from the analysis of the repository content 160.

In step 306, the indexing controller process 142 (i.e., the indexing service selector 144 in FIG. 3) invokes the appropriate content indexing service(s) 150 on the repository content 160 to produce one or more second set of classification data (e.g., additional mated data in a markup language format) containing values for attributes derived from examination of the repository content 160. As an example, based on their respective content types which they are capable of indexing, the content indexing services 150 can perform respective analysis of repository content such as video data by a video data content indexing service, electronic book data by an ebook content indexing service and so forth.

Returning attention briefly back to FIG. 4 and specifically to the second set of classification data 170-BX produced as a result of operation of the ebook content indexing service 150-M upon the ebook repository content 160-X, the second set of classification data 170-BX includes in this example XML metadata indicating word and page counts for pages within the electronic book repository content 160-X, as well as chapter counts and chapter titles, a reading level (e.g., e.g., medium, difficult based upon vocabulary used within the repository content) of the content, character names, names of interest such as cities referenced and so forth. It is to be understood that the examples of content indexing services provided in the description of embodiments of this invention is not intended to be limiting and that more or less detail may be produced as a result of operating a content indexing service upon repository content according to embodiments of this invention.

Returning attention now to the flow chart of processing steps in FIG. 5 and specifically to step 307, the indexing controller process 142 adds the second set of classification data 170-BX produced from operating the content indexing service 150-M (electronic book content indexing service in example in FIG. 4) into the index registry 180 to allow indexing access to the repository content 160-X based upon the values of attributes contained in the second set of classification data 170-BX, and/or the values of an attribute within the first set of classification data 170-AX (e.g., within the original markup language mated data received in the repository submission 155 along with the repository content 160).

In this manner, embodiments of the invention as explained above allow content indexing service developers to develop content indexing services for specific types of repository content and allow those services to be registered with an indexing controller process configured according to embodiments of the invention. Thereafter, repository submissions 155 that contain repository content 160 can be received by an indexing controller process 142 which activates the appropriate content indexing service or services 150 to produce additional metadata 170-B derived from analysis of the actual repository item content 160. This additional metadata can be further added or registered into a registry in order to provide additional or more comprehensive indexing access to the repository items associated with that registry. This provides a registry such as an ebXML registry a mechanism to index arbitrary repository items in an extensible and pluggable manner due to the fact that the indexing controller process allows registration of new or different content indexing services as need arises. One result of such a system is that content clients 120 that provide queries to the registry are able to discover repository items in the registry using an automatically generated index produced by the invention in the event that little or no classification data is initially submitted with repository content to the registry.

Those skilled in the art will understand that there can be many variations made to the embodiments explained above while still achieving the same objective of those embodiments and the invention in general. Such variations are intended to be covered by the scope of this invention. As such, the foregoing descriptions of embodiments of the invention are not intended to be limiting. Rather, any limitations to the invention are presented in the claims that follow.

What is claimed is:

1. A method for indexing content in a computer system, the method comprising the steps of:
    receiving repository content of at least one type;
    identifying a content indexing service from a set of available content indexing services, the identified content indexing service being associated with the at least one type of repository content;
    operating the content indexing service on the repository content to produce classification data derived from the repository content;
    associating the classification data to a registry of classification data to allow indexing access to the repository content based on the classification data;
    registering the content indexing service, capable of indexing the at least one type of repository content, with the set of available content indexing services;
    associating the registered content indexing service with the at least one type of repository content which that content indexing service can index; and
    wherein upon receipt of the repository content, the step of identifying comprises the step of identifying the registered content indexing service from the set of available content indexing services based on the at least one type of repository content which that content indexing service can index and the type of the repository content received in the step of receiving.

2. The method of claim 1 wherein the step of identifying comprises the steps of:
    determining the at least one type of content of the repository content; and
    selecting the at least one content indexing service from the set of available content indexing services based on the at least one type of content of the repository item.

3. The method of claim 1 wherein:
    the repository content contains at least two types of repository content;
    the step of identifying comprises the step of identifying respective content indexing services for each of the at least two types of content; and
    wherein the step of operating comprises the step of operating each of the identified respective content indexing services to produce respective sets of classification data for which the step of associating associates to the registry of classification data to allow indexing access to the at least two types of repository content based on the respective sets of classification data.

4. The method of claim 3 wherein the respective content indexing services are provided by a single content indexing service capable of indexing multiple types of repository content to produce classification data for each type of repository content.

5. The method of claim 1 wherein:
    the repository content is in a markup language format and wherein the step of receiving repository content comprises the step of receiving a first set of classification data containing values for a first set of attributes associated with the repository content;
    the identified content indexing service is designed to index repository content of a specific type; and
    wherein the step of operating the content indexing service comprises the step of:
        invoking the content indexing service on the repository content to produce at least one second set of classification data containing values for attributes derived from examination of the repository content, the at least one second set of classification data being produced in addition to the first set of classification data.

6. The method of claim 5 wherein the first set of classification data is markup language metadata associated with the repository content and wherein the step of receiving the repository content comprises the step of:
    adding the repository content and the first set of classification data into a indexed registry, the indexed registry allowing indexing access to repository content based on classification data maintained within the indexed registry.

7. The method of claim 6 wherein the step of associating the classification data to a registry of classification data comprises the step of:
    adding the second set of classification data produced from the step of operating the content indexing service into the indexed registry to allow indexing access to the repository content based on:

i) the values of attributes contained in the second set of classification data produced by the content indexing service; and ii) the value of attributes within the markup language metadata.

8. The method of claim 7 wherein the repository content is a markup language document and wherein the indexed registry is a markup language registry and wherein the step of operating the content indexing service comprises the step of operating the content indexing service to produce a markup language document containing the second set of classification data derived from an examination of the repository content conforming to a markup language registry specification.

9. The method of claim 8 wherein the markup language is an extensible markup language and wherein the registry specification is an extensible markup language registry specification.

10. A computerized device for indexing content, the computerized device comprising:
 a processor;
 a memory; and
 an interconnection mechanism coupling the processor and the memory;
 wherein the memory is encoded with an indexing controller application and wherein the processor can access the memory via the interconnection mechanism to perform the indexing controller application to produce an indexing controller process that when performed in the computerized device causes the computerized device to perform the operations of:
 receiving repository content of at least one type;
 identifying a content indexing service from a set of available content indexing services, the identified content indexing service being associated with the at least one type of repository content;
 operating the content indexing service on the repository content to produce classification data derived from the repository content;
 associating the classification data to a registry of classification data to allow indexing access to the repository content based on the classification data;
 registering the content indexing service, capable of indexing the at least one type of repository content, with the set of available content indexing services;
 associating the registered content indexing service with the at least one type of repository content which that content indexing service can index; and
 wherein upon receipt of the repository content, the step of identifying comprises the step of identifying the registered content indexing service from the set of available content indexing services based on the at least one type of repository content which that content indexing service can index and the type of the repository content received in the step of receiving.

11. The computerized device of claim 10 wherein when the processor performs the indexing controller process, the computerized device performs the operations of:
 determining the at least one type of content of the repository content; and
 selecting the at least one content indexing service from the set of available content indexing services based on the at least one type of content of the repository item.

12. The computerized device of claim 10 wherein:
 the repository content contains at least two types of repository content;
 the operation of identifying performed by the indexing controller process comprises the operation of identifying respective content indexing services for each of the at least two types of content; and
 wherein the operation of operating performed by the indexing controller process comprises the operation of operating each of the identified respective content indexing services to produce respective sets of classification data for which the operation of associating associates to the registry of classification data to allow indexing access to the at least two types of repository content based on the respective sets of classification data.

13. The computerized device of claim 12 wherein the respective content indexing services are provided by a single content indexing service capable of indexing multiple types of repository content to produce classification data for each type of repository content.

14. The computerized device of claim 10 wherein:
 the repository content is in a markup language format and wherein the operation of receiving repository content as performed by the indexing controller process comprises an operation of receiving a first set of classification data containing values for a first set of attributes associated with the repository content;
 the identified content indexing service is designed to index repository content of a specific type; and
 wherein when the processor performs the indexing controller process to perform the operation of operating the content indexing service, the processor performs the indexing controller process to perform the operation of:
 invoking the content indexing service on the repository content to produce at least one second set of classification data containing values for attributes derived from examination of the repository content, the at least one second set of classification data being produced in addition to the first set of classification data.

15. The computerized device of claim 14 wherein the first set of classification data is markup language metadata associated with the repository content and wherein when the processor performs the indexing controller process to perform the operation of receiving the repository content, the processor performs the indexing controller process to perform the operation of:
 adding the repository content and the first set of classification data into a indexed registry, the indexed registry allowing indexing access to repository content based on classification data maintained within the indexed registry.

16. The computerized device of claim 15 wherein when the processor performs the indexing controller process to perform the operation of associating the classification data to a registry of classification data, the processor performs the indexing controller process to perform the operation of:
 adding the second set of classification data produced from the step of operating the content indexing service into the indexed registry to allow indexing access to the repository content based on:
 i) the values of attributes contained in the second set of classification data produced by the content indexing service; and
 ii) the value of attributes within the markup language metadata.

17. The computerized device of claim 16 wherein the repository content is a markup language document and wherein the indexed registry is a markup language registry and wherein when the processor performs the indexing controller process to perform the operation of operating the content indexing service, the processor performs the indexing controller process to perform the operation operating the content indexing service to produce a markup language document containing the second set of classification data derived from an examination of the repository content conforming to a markup language registry specification.

18. The computerized device of claim 17 wherein the markup language is an extensible markup language and wherein the registry specification is an extensible markup language registry specification.

19. A computer program product having a computer-readable medium including computer program logic encoded thereon that when performed on a computer system having a coupling of a memory and a processor, causes the processor to index repository content by causing the processor to perform the operations of:

receiving repository content of at least one type;

identifying a content indexing service from a set of available content indexing services, the identified content indexing service being associated with the at least one type of repository content;

operating the content indexing service on the repository content to produce classification data derived from the repository content;

associating the classification data to a registry of classification data to allow indexing access to the repository content based on the classification data;

registering the content indexing service, capable of indexing the at least one type of repository content, with the set of available content indexing services;

associating the registered content indexing service with the at least one type of repository content which that content indexing service can index; and wherein upon receipt of the repository content, the step of identifying comprises the step of identifying the registered content indexing service from the set of available content indexing services based on the at least one type of repository content which that content indexing service can index and the type of the repository content received in the step of receiving.

20. A computerized device for indexing content, the computerized device comprising:

a processor;

a memory; and an interconnection mechanism coupling the processor and the memory;

wherein the memory is encoded with an indexing controller application and wherein the processor can access the memory via the interconnection mechanism to perform the indexing controller application to produce an indexing controller process that when performed in the computerized device, causes the computerized device to provide means comprising:

means for receiving repository content of at least one type;

means for identifying a content indexing service from a set of available content indexing services, the identified content indexing service being associated with the at least one type of repository content;

means for operating the content indexing service on the repository content to produce classification data derived from the repository content;

means for associating the classification data to a registry of classification data to allow indexing access to the repository content based on the classification data;

means for registering the content indexing service, capable of indexing the at least one type of repository content, with the set of available content indexing services;

means for associating the registered content indexing service with the at least one type of repository content which that content indexing service can index; and wherein upon receipt of the repository content, the step of identifying comprises the step of identifying the registered content indexing service from the set of available content indexing services based on the at least one type of repository content which that content indexing service can index and the type of the repository content received in the step of receiving.

* * * * *